United States Patent
Fenchel et al.

(10) Patent No.: US 9,799,120 B1
(45) Date of Patent: Oct. 24, 2017

(54) METHOD AND APPARATUS FOR ATLAS/MODEL-BASED SEGMENTATION OF MAGNETIC RESONANCE IMAGES WITH WEAKLY SUPERVISED EXAMINATION-DEPENDENT LEARNING

(71) Applicant: Siemens Healthcare GmbH, Erlangen (DE)

(72) Inventors: Matthias Fenchel, Erlangen (DE); Yiqiang Zhan, Berwyn, PA (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/149,474

(22) Filed: May 9, 2016

(51) Int. Cl.
- *G06K 9/00* (2006.01)
- *G06T 7/00* (2017.01)
- *G06T 11/00* (2006.01)
- *G06K 9/62* (2006.01)

(52) U.S. Cl.
CPC ............ *G06T 7/0089* (2013.01); *G06K 9/627* (2013.01); *G06K 9/6262* (2013.01); *G06T 11/008* (2013.01); *G06T 2207/10088* (2013.01); *G06T 2207/20128* (2013.01)

(58) Field of Classification Search
CPC ............... G06T 7/0089; G06T 11/008; G06T 2207/10088; G06T 2207/20128; G06T 7/10; G06T 7/11; G06K 9/6262; G06K 9/627; A61B 2576/00
See application file for complete search history.

(56) References Cited

U.S. PATENT DOCUMENTS

| | | | | |
|---|---|---|---|---|
| 2012/0281900 | A1* | 11/2012 | Rueckert | G06K 9/468 382/131 |
| 2015/0003703 | A1* | 1/2015 | Franz | A61B 5/055 382/128 |
| 2015/0023575 | A1 | 1/2015 | Valadez et al. | |
| 2015/0078640 | A1* | 3/2015 | Guo | G06T 7/0083 382/131 |

OTHER PUBLICATIONS

Andreasen et al., "Patch-Based Generation of a Pseudo CT from Conventional MRI Sequences for MRI-only Radiotherapy of the Brain," Medical Physics, vol. 42 (4) pp. 1596-1605 (2015).

* cited by examiner

*Primary Examiner* — Yon Couso
(74) *Attorney, Agent, or Firm* — Schiff Hardin LLP

(57) ABSTRACT

In a magnetic resonance (MR) apparatus and segmentation method, a region in an MR image, acquired from a scan of a patient with an MR scanner of the apparatus, is provided to a computer for segmentation of the region from the overall image dataset. The segmentation takes place based on a classification of image elements of the image dataset, and the classification is iteratively re-trained in a weakly supervised learning algorithm based on examination-specific information provided to the computer.

15 Claims, 2 Drawing Sheets

METHOD AND APPARATUS FOR ATLAS/MODEL-BASED SEGMENTATION OF MAGNETIC RESONANCE IMAGES WITH WEAKLY SUPERVISED EXAMINATION-DEPENDENT LEARNING

BACKGROUND OF THE INVENTION

Field of the Invention

The present invention concerns the field of segmenting an organ or other region of interest in an image, or image data, acquired in a magnetic resonance data acquisition scan procedure, and in particular to implementing such segmentation using an atlas or a model that does not precisely cover or encompass the organ or region of interest that is to be segmented.

Description of the Prior Art

Magnetic resonance imaging is a widely used imaging modality for providing images of a patient to a physician in order to allow the physician to make a particular medical diagnosis. A general explanation of the fundamental concepts of magnetic resonance imaging is as follows.

Magnetic resonance data are acquired from a patient by placing the patient on a movable bed or support within an opening of the magnetic resonance scanner that is designed to receive the patient therein. A basic field magnet of the magnetic resonance scanner generates a strong and highly uniform basic magnetic field that causes nuclear spins within the patient to be aligned according to the field lines of the basic magnetic field. One or more radio-frequency (RF) pulses are then radiated by an RF radiator in the magnetic resonance scanner and the RF energy in the RF field associated with such RF pulses causes certain nuclear spins to be tilted from the alignment produced by the basic magnetic field, by an amount that is commonly called the flip angle. After the RF pulse terminates, these "flipped" nuclear spins begin to relax and, in doing so, emit RF signals that are referred to as magnetic resonance signals.

As the nuclear spins emit these magnetic resonance signals, gradient pulses are activated that spatially encode the magnetic resonance signals, with readout of the magnetic resonance signals taking place during the activation of a gradient pulse also known as a readout pulse.

The relaxation or decay of the excited nuclear spins following termination of the RF pulse is called an echo, and the duration of this echo is called the echo time, designated TE. The acquired magnetic resonance signals are analog signals, and these analog signals are supplied to a computer wherein they are digitized and converted into complex numbers, and are entered into an electronic memory. These values in the electronic memory represent a mathematical domain known as k-space, and thus the values in the memory are referred to as k-space data, or raw data.

The raw data must then be converted into image data so as to be viewable as a magnetic resonance image of the subject, or at least an image of the region of the subject from which the raw data were acquired. Many image reconstruction algorithms are known for reconstructing an image of the patient from the raw data.

The image data are made available from the computer that executed the reconstruction algorithm as a data file, which can be provided to a display monitor for viewing, or can be archived for storage and later viewing, or can be electronically transferred to any remote location for viewing or storage at the remote location. The basic operation of such a magnetic resonance tomography apparatus, and the magnetic resonance scanner thereof, are well known to those of ordinary skill in the field of magnetic resonance imaging, and need not be described in more detail herein.

For use in all types of image processing, including medical image processing, segmentation techniques or algorithms are known for extracting a desired item from a larger image in which the desired item is represented. In the case of medical imaging, the extracted item is usually the respective organ for which the diagnosis is to be made.

In the case of magnetic resonance images in which bones are represented, bone segmentation presents a challenge, for several reasons. Due to the short relaxation times (echo times) of the magnetic resonance signals produced by nuclei in bone tissue, the magnetic resonance signal, particularly in cortical bone, is low, when the magnetic resonance scanner is operated according to a conventional sequence of RF pulses and gradients. This makes it difficult, or almost impossible, to distinguish between bone and air or lung tissue, for example. Special data acquisition sequences, such as those that produce an ultra-short TE, and which are thus capable of acquiring signals from water-bound protons within the inorganic cortical structure of the bone, usually suffer with regard to image quality or other restrictions that limit the practical use of such sequences. Moreover, such special sequences often are not suitable for diagnostic purposes, thereby disqualifying their use in clinical routine.

Despite these problems, bone segmentation is an important consideration for many magnetic resonance applications, such as for attenuation correction in MR-PET, and dose calculation in MR-based radio therapy planning. Applications such as MR bone scans also benefit from advanced visualizations, such as cropping the content of bone or planar projections of bone structures, which is possible if anatomical bone information is available. Moreover, quantitative results, such as changes in MR biomarkers, such as ADC values in the bone marrow can be automatically derived, if information about the bone structure is available.

The current state of the art for bone segmentation is to start with a data file frim a model library (memory) or an atlas, which make use of a common diagnostic MR imaging contrast (Dixon technique) to non-rigidly register an articulated model of several bones of known shapes, in order to segment the bone in an unknown example from an acquired image. This technique is described in United States Patent Application Publication No. 2015/0023575 A1, the content of which is incorporated herein by reference.

A drawback of this known technique is that, for each bone, high-quality co-registered pairs of MR and CT scans are required, which serve as the model. For fine bones, such as in the shoulder or the ribs, it is difficult to meet this requirement. This means that current implementation of this known method is not suitable for all bones. Moreover, anatomical variants beyond the limits of the non-rigid registration can lead to inaccurate segmentation results.

Other methods have been proposed to segment bone directly from diagnostic MR contrasts in acquired MR data. One such method is a patch-based segmentation from multiple MR contrasts, using a deep-learning approach, which is described in "Patch-Based Generation of a Psuedo CT From Conventional MRI Sequences For MRI-Only Radio Therapy of the Brain," Andreasen et al., Medical Physics, Vol. 42(4), pp 1596-1605 (2015). A drawback of this known technique is that, due to the bias-variance tradeoff, the training data may not include all possible variants of MR contrast, which results in a strong sensitivity to the input contrasts, which can be a problem if, in practice, the acquisition protocols are modified, or studies are done using different hardware settings, and appropriate normalization algorithms are not available.

SUMMARY OF THE INVENTION

An object of the present invention is to provide a bone segmentation procedure that avoids or minimizes the aforementioned drawbacks of known techniques, and that is suitable for use in ordinary clinical practice.

In accordance with the invention, the segmentation, which is performed by a computer or a combination of processors, is implemented with weakly supervised learning that is examination-dependent. As used herein, "examination-dependent learning" means that the learning proceeds based on information, provided to the computer system that is performing the segmentation, which pertains specifically to the examination that produced the image from which a segmented portion is to be extracted. This information can be dependent on the patient (age, gender, medical history, body attributes, etc.) or on the protocol used to operate the scanner to acquire the image, or hardware of the scanner that have a known or predictable influence on the image.

Such segmentation with weakly supervised learning is achieved in accordance with the present invention in a method and apparatus for segmenting an object of image in an MRI image wherein an atlas/model-based initial segmentation takes place wherein this initial segmentation employs a classification or procedure or algorithm in order to select pixels or voxels for inclusion in the segmented region of the image, and wherein this initially-employed segmentation classification is then improved by re-training the classifier in a learning (neural network) procedure that makes use of additional information associated with the scan that produced the MR image in which the segmentation is to take place. The re-training of the classifier is used in order to adjust the classification so that the ultimate result of the segmentation procedure includes structure or content in the segmented item that is not present in the initial segmentation.

For example, in the case of bone segmentation, relevant bones with a finer structure can be included in the final segmentation result that would be missed in the initial segmentation.

The invention is based on the fact that, for a typical MR scan, a significant amount of information, other than the acquired MR data, is available, such as additional MR contrasts, such as T2-weighted images or diffusion-weighted images, as well as patient information, noted above. In accordance with the invention, this additional information is provided to the segmentation classifier, so that the classifier, after the initial segmentation, is re-trained in an individualized manner that is specifically adapted to the conditions that existed during the original scan.

In addition to re-training the classifier, this information can also be used to improve the data file from the atlas, or the model, that was used for the initial segmentation.

The classifier re-training and/or the atlas/model improvement can be done iteratively, until a termination criterion is reached. The termination criterion can be automatically set, such as a predetermined number of iterations or the achievement of an objectively-measurable (detectable) quality of the segmented region. Alternatively, the result of each iteration can be viewed at a display monitor in communication with the computer in which the segmentation is being conducted by a physician, and the termination criterion can be an input to the computer made by the physician when the segmented region appears satisfactory to the physician.

DESCRIPTION OF THE PREFERRED EMBODIMENTS

Figure 1:
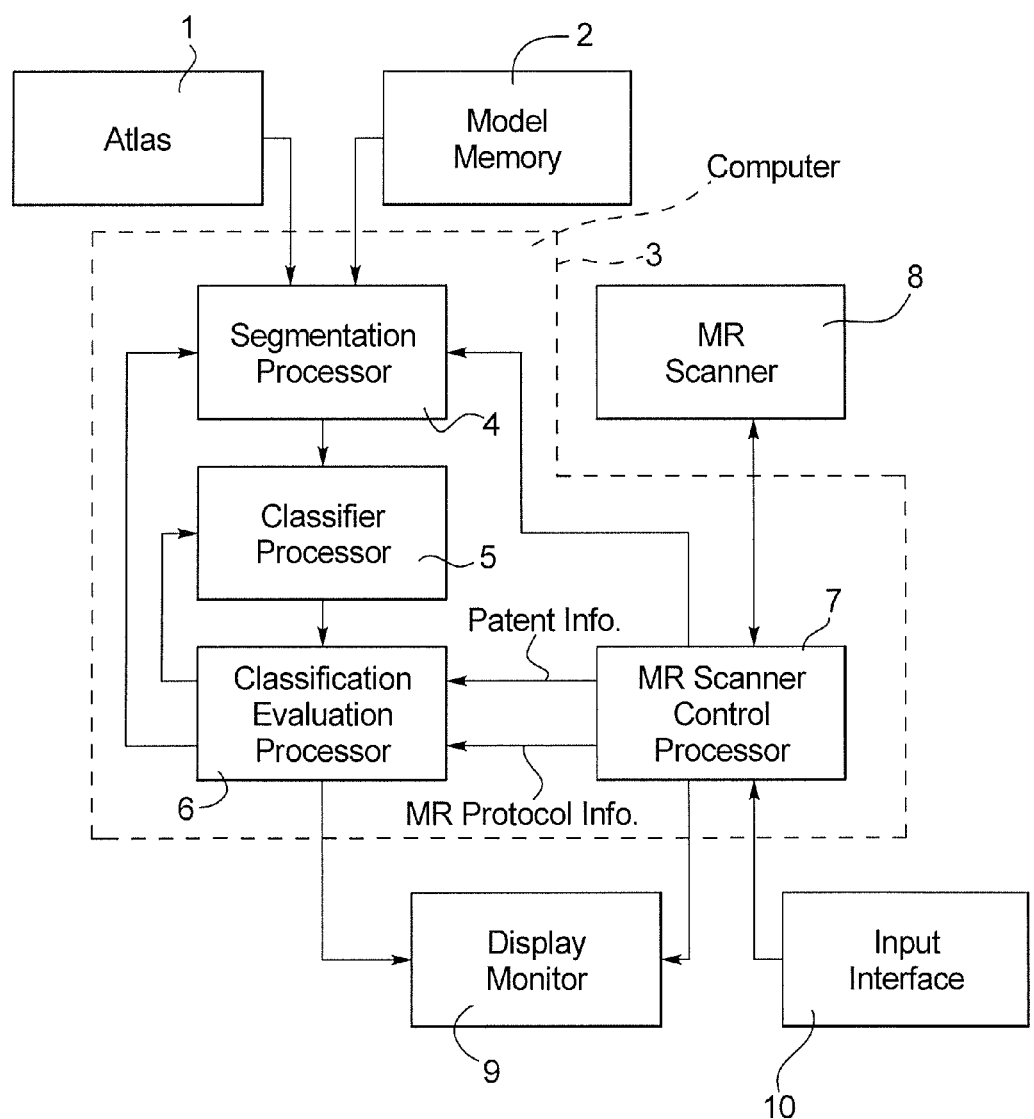
FIG. 1 is a block diagram that schematically shows the basic components of a magnetic resonance apparatus constructed and operating in accordance with the present invention.

As shown in FIG. 1, the apparatus according to the invention makes use of an atlas 1 and/or a model memory 2 that provide a data file or model to a computer 3, specifically to a segmentation processor 4 of the computer 3. The segmentation processor 4 is also provided with a data file representing an MR image of a region of a patient, acquired by operation of an MR scanner 8. The MR image data file is provided from an MR scanner control processor 7 that operates the MR scanner 8 and generates image information from the acquired MR data in a known manner.

The acquired MR data represent image elements (pixels in the case of a 2D image, and voxels in the case of a 3D image), that each has different attributes or characteristics, such as intensity. The segmentation processor 4 operates in combination with a classifier processor 5 in order to classify the image elements of the provided MR image, in order to identify and extract image elements therefrom that have the image element attributes or characteristics that are to be expected for the desired region to be segmented, such as a bone structure.

This serves as an initial segmentation, and produces an initial segmentation result, which is supplied to a classification evaluation processor of the computer 3. The classification evaluation processor is also provided with additional information of the type that is commonly known from the implementation of the sequence that operated the MR scanner in order to acquire the MR image that was supplied to the segmentation processor 4. This information can be, for example, patient information and/or MR protocol information. The MR protocol information can "inform" the classification evaluation processor as to details of the contrast that is present in the provided MR image that, in turn, affects the image element intensity or other characteristics or attributes of the image elements.

As described in more detail in connection with FIG. 2, the classification evaluation processor 6 makes use of that additional information to re-train the classifier processor 5, which then provides a further segmentation result to the classification evaluation processor 6. When this procedure results in a satisfactory segmentation, the classification evaluation processor can make a further determination as to whether the data file from the atlas 1 or the model from the model memory 2 can or should be improved. If so, the classification evaluation processor provides an input to the segmentation processor 4, again based on the additional information provided to the classification evaluation processor 6, and the segmentation processor 4 then improves the atlas file or the model based on that information, according to known procedures.

When the overall classifier re-training and atlas/model improvement procedure has been completed, the final segmentation result is provided from the classification evaluation processor 6 to a display monitor, for viewing by the physician. It is also possible that each intermediate segmentation result can be provided to the display monitor 9, so that the physician can view each result and decide whether the segmentation procedure should be continued, or whether the currently-viewed segmentation result is satisfactory.

The MR scanner control processor 7 is operated via an input interface in a known manner, so as to provide the MR scanner control processor with appropriate inputs that define the patient information and the MR protocol that is it be used.

In FIG. 1, the segmentation processor 4, the classifier processor 5, the classification evaluation processor 6 and the MR scanner protocol processor 7 are all shown as components of the aforementioned computer 3. It is also possible for those components to be stand-alone processors, connected by a bus. Moreover, these processors need not be physical, individual hardware-based processors, but can be appropriate software modules or routines of an overall operating program for the computer 3.

Figure 2:
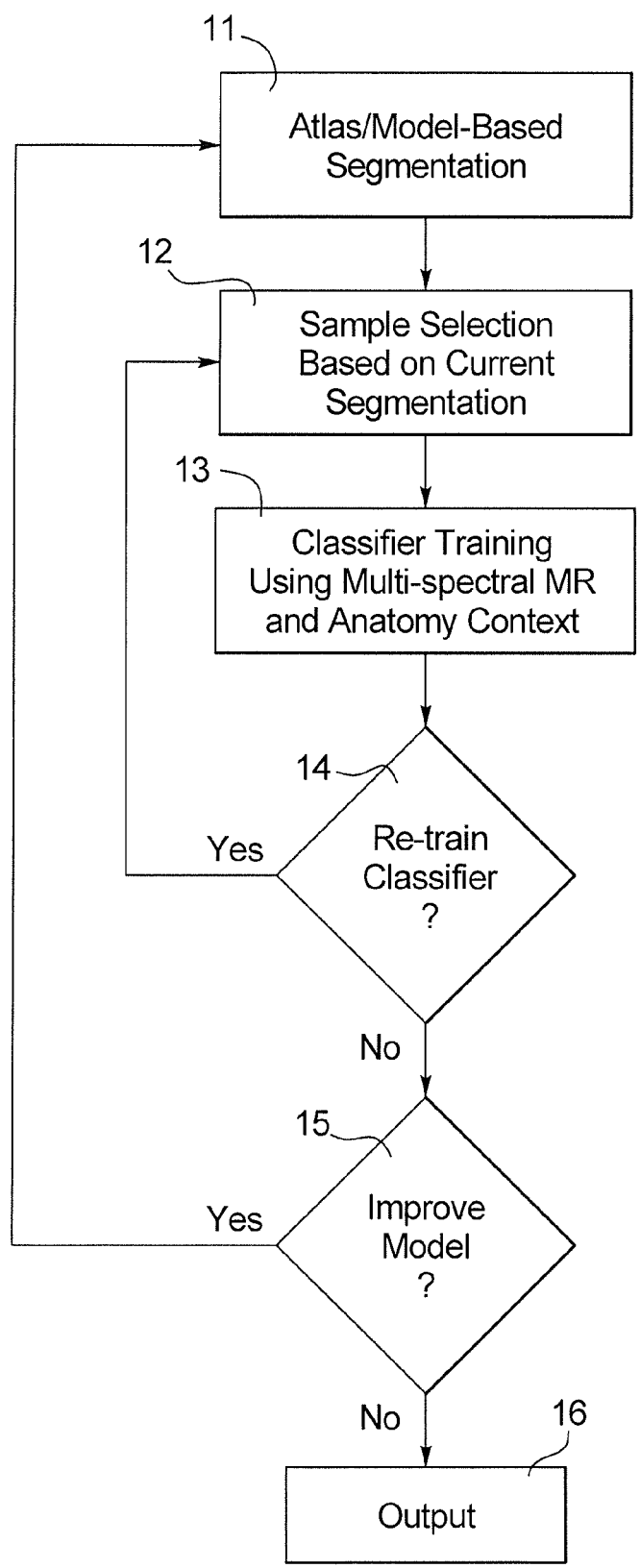
FIG. 2 is a flowchart showing the basic steps in an embodiment of the segmentation procedure according to the present invention.

The basic steps in an embodiment of the method, by which the apparatus shown in FIG. 1 is operated, are shown in the flowchart of FIG. 2. This embodiment will be explained in the context of a 3D image composed of voxels, but the method is equally applicable to segmentation of 2D images composed of pixels. In general, the method is applicable to any multi-dimensional segmentation.

The method begins in step 11, wherein an initial segmentation is implemented in a known manner, based on a representation of the organ or region of interest selected as a data file from an anatomical atlas, or based on a modeled representation of the organ or region of interest, selected from a model library. Based on this information, a region mask or organ mask is produced, that is applied to the voxels of the 3D MR image, from which the organ or region is to be segmented. In the specific application of bone segmentation, the aforementioned mask is a bone mask that is an initial attempt at defining the specific bone structure that is to be segmented. In accordance with the invention, it is expected that this initial mask will not be able to produce a segmentation result that includes finer structures within the overall desired structure.

Based on the voxels in the image data supplied for the initial segmentation, the generated region mask, or feature mask, sets a feature or characteristic for each voxel that is to be extracted in the segmentation procedure from the overall set of image data. The mask allows computation of this feature or characteristic for each individual voxel, and may be based on the actual grey values of the overall image contrast for a particular voxel, but also may be dependent on values of neighboring voxels in order to place the individual voxel in question in appropriate anatomical context.

The result of this initial segmentation generated in step 12 is provided to a classifier training step 13, wherein the segmentation classifier, used in step 12, is train or re-trained using additional data provided thereto from the processor that controlled the generation of the aforementioned image data. The data used for re-training, therefore, are directly associated with the subject under examination, and can be, for example, patient-specific data describing attributes or medical history of the patient, and/or information describing the operation of the MR scanner that was used to generate the image data, such as the protocol that was used. For example, various organ-specific protocols are commercially available, such as a liver protocol that are specifically designed to acquire MR data from a particular organ. By having this specific knowledge that the liver (for example) is to be segmented, the classification used in the segmentation procedure can be re-trained.

The data provided for the classifier training in step 13 are partitioned into two classes, a first class being the positive training samples at the position of the bone mask and the other class being the negative training samples, which are the voxels of the bone mask itself. Morphological operations may be applied to the bone mask, in order to generate neutral zones, which can account for possible misregistration of the bone model from the actual image data in the initial segmentation. Such neutral zones are treated as neither positive nor negative in the classification.

The classification that is re-trained in step 13 is any suitable supervised machine-learning algorithm such as a regression model, specifically a non-linear regression model, a Gaussian regression model, a boosting classifier, a support vector machine (SVM), a random forest, a deep neural network, or other suitable type of classifier known to those of ordinary skill in the field of image processing. It is also possible to use unsupervised classifiers, such as clustering algorithms.

The segmentation is produced by the classifier trained in step 13 is evaluated in step 14. Any appropriate criterion can be used for this evaluation, such as automated evaluation of the segmented image that results from the initial segmentation, subjective viewing at a display of this initial segmentation image by a physician, or simply a count of a number of iterations of the classifier re-training can be used. If the result of the classifier evaluation in step 14 is that further re-training of the classifier is desirable, the initial segmentation result is returned as an input in step 12, and is used as the starting point for a further segmentation and a further iteration of the classifier training. For example, only the positive results from the preceding classification may be used in the next iteration of the re-training.

When the result of the evaluation in step 14 indicates that the classifier training is either satisfactory, or cannot be significantly improved further, the output from step 14 proceeds to step 15, wherein the result is evaluated for the purpose of determining whether the model or atlas file can be improved. If this is the case, the procedure returns to step 11, and a different or modified atlas data file or model is used, and steps 12 and 13 are repeated. The improved model may not have an effect on the re-training of the classifier that was already implemented, in which case the model improvement iterations will proceed through step 14 with the "no" result in each iteration, until a termination criterion is reached in step 15. It is of course also possible that in the model improvement iterations, re-training of the classifier, if needed, may also be again implemented.

When a predetermined number of model improvement iterations, or another suitable termination criterion, is satisfied, the final result of the segmentation is provided as an output in step 16, such as in the form of a data file for viewing at the display monitor 9, or for archiving.

The method and apparatus in accordance with the invention have the advantage that both the training and the prediction phase can be fully automated. The aforementioned risk of overfitting is reduced, because there is an individualized classifier for each patient and each study. If and when the same patient is scanned again, the classifier will be re-trained and optimized for this new input, in which case previous scans may also be used in step 13 for training the classifier in the context of this new scan.

The invention also allows leveraging of multi-spectral MR data of the specific patient. Although multi-spectral MR data are helpful for tissue classification, they may not be available for a large population in order to train a population-based classifier, but because the inventive procedure is patient specific, such data can be used in accordance with the present invention.

The inventive procedure is adaptable to different MR protocols. Because the classifier training is performed on-line, this framework is able to be used with image data from patient-to-patient, with each image dataset possibly being acquired with a different MR protocol (as long as the Dixon sequence is available for an initial atlas-based segmentation as described in the aforementioned United States Patent Application Publication No. 2015/0023575 A1).

The basic concept of the inventive procedure is an assumption that the model-based segmentation is the best available ground-truth for bone segmentation beyond the available model, and is particularly suitable for facilitating computerized learning of the cortical bone and marrow intensity pattern for a specific patient in a specific study, with the maximum number of available input contrasts and other information.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for segmenting a selected region from a set of magnetic resonance (MR) image data, comprising:
    providing a computer with an MR image dataset, acquired from a patient by operation of an MR scanner to conduct an MR scan of a region of the patient, said MR image dataset being comprised of a plurality of image elements including image elements of said region;
    providing said computer with an input data file, which is non-specific for said patient, and which designates attributes of image elements that are expected in a generalized representation of said region;
    in said computer, producing a segmentation mask dependent on the expected attributes of said image elements of said generalized version of said region in said input data file;
    in said computer, applying said segmentation mask to said MR image dataset to extract image elements therefrom that form an initial segmentation of said region of said patient from said MR image dataset;
    in said computer, applying an image element classification, based on said image attributes, to the image elements in said initial segmentation by executing a classification algorithm, and thereby obtaining an initial classification result of said image elements in said region in said initial segmentation;
    in said computer, evaluating said classification and re-training said classification algorithm in said computer, in a plurality of iterations, dependent scan-specific on information provided to said computer and, in each iteration, applying each re-trained classification to a further segmentation of said region, until a termination criterion is satisfied, thereby obtaining a final segmentation of said region of said patient from said MR image dataset; and
    making the final segmentation of said region available in electronic form from said computer, as an output data file.

2. A method as claimed in claim 1 comprising, at a display monitor in communication with said computer, displaying each further segmentation from each iteration as each iteration is completed.

3. A method as claimed in claim 1 comprising:
    before providing said final segmentation of said region as said output data file, evaluating said final segmentation of said region in said computer to determine whether modification of said input data file is needed and, if so, modifying said input data file and repeating segmentation of said region using the modified input data file in a plurality of further iterations, until a further termination criterion is satisfied, and then emitting said final segmentation of said region in said output data file.

4. A method as claimed in claim 3 comprising, at a display monitor in communication with said computer, displaying each segmentation from each iteration of re-training said classification algorithm, and each segmentation from each further iteration of modifying said input data file.

5. A method as claimed in claim 1 comprising employing, as said input data file, a generalized representation of said region obtained from an anatomical atlas.

6. A method as claimed in claim 1 comprising employing, as said input data file, a modeled representation of said region obtained from a model library.

7. A method as claimed in claim 1 comprising providing said scan-specific information as patient-specific information that designates anatomical or medical attributes of the patient.

8. A method as claimed in claim 1 comprising providing said scan-specific information as protocol-specific information that designates an MR data acquisition protocol that was used to acquire said MR image dataset of the patient in said scan of said region.

9. A method as claimed in claim 1 comprising providing said scan-specific information as multi-spectral MR data information describing said MR dataset.

10. A method as claimed in claim 1 wherein said MR dataset also comprises data obtained from a non-MR imaging modality, and providing said examination-specific information as multi-modality information describing said non-MR imaging modality.

11. A magnetic resonance (MR) apparatus comprising:
    an MR data acquisition scanner;
    a computer configured to operate the MR data acquisition scanner to acquire an MR image dataset from a patient in a scan of a region of the patient, said MR image dataset being comprised of a plurality of image elements including image elements of said region;
    said computer being configured to receive with an input data file, which is non-specific for said patient, and which designates attributes of image elements that are expected in a generalized representation of said region;
    said computer being configured to produce a segmentation mask dependent on the expected attributes of said image elements of said generalized version of said region in said input data file;
    said computer being configured to apply said segmentation mask to said MR image dataset to extract image elements therefrom that form an initial segmentation of said region of said patient from said MR image dataset;
    said computer being configured to apply an image element classification, based on said image attributes, to the image elements in said initial segmentation by executing a classification algorithm, and thereby obtaining an initial classification result of said image elements in said region in said initial segmentation;

computer being configured to receive scan-specific information about said scan;

said computer being configured to evaluate said classification and to re-train said classification algorithm in said computer, in a plurality of iterations, dependent on said scan-specific information provided to said computer and, in each iteration, to apply each re-trained classification to a further segmentation of said region, until a termination criterion is satisfied, thereby obtaining a final segmentation of said region of said patient from said MR image dataset; and said computer being configured to make the final segmentation of said region available in electronic form from said computer, as an output data file.

12. An apparatus as claimed in claim 11 comprising a display monitor in communication with said computer, and wherein said computer is configured to display, at said display monitor, each further segmentation from each iteration as each iteration is completed.

13. An apparatus as claimed in claim 11 wherein said computer is configured to evaluate said final segmentation of said region, before providing said final segmentation of said region as said output data file, to determine whether modification of said input data file is needed and, if so, to modify said input data file and repeat segmentation of said region using the modified input data file until a further termination criterion is satisfied, and then to emit said final segmentation of said region in said output data file.

14. An apparatus as claimed in claim 13 comprising a display monitor in communication with said computer, and wherein said computer is configured to display, at said display monitor, each segmentation from each iteration of re-training said classification algorithm, and each segmentation from each further iteration of modifying said input data file.

15. A non-transitory, computer-readable data storage medium encoded with programming instructions, said storage medium being loaded into a computer of a magnetic resonance (MR) apparatus that comprises an MR data acquisition scanner, said programming instructions causing said computer to:

receive an MR image dataset, acquired from a patient by operation of an MR scanner to conduct an MR scan if a region of the patient, said MR image dataset being comprised of a plurality of image elements including image elements of said region;

receive an input data file, which is non-specific for said patient, and which designates attributes of image elements that are expected in a generalized representation of said region;

produce a segmentation mask dependent on the expected attributes of said image elements of said generalized version of said region in said input data file;

apply said segmentation mask to said MR image dataset to extract image elements therefrom that form an initial segmentation of said region of said patient from said MR image dataset;

apply an image element classification, based on said image attributes, to the image elements in said initial segmentation by executing a classification algorithm, and thereby obtaining an initial classification result of said image elements in said region in said initial segmentation;

receive scan-specific information about said scan;

evaluate said classification and re-train said classification algorithm, in a plurality of iterations, dependent on said scan-specific information and, in each iteration, apply each re-trained classification to a further segmentation of said region, until a termination criterion is satisfied, thereby obtaining a final segmentation of said region of said patient from said MR image dataset; and make the final segmentation of said region available in electronic form from said computer, as an output data file.

* * * * *